United States Patent

Ballinger

[15] 3,662,397

[45] May 9, 1972

[54] THERMAL SENSITIVE RECORDING MEDIUM RESPONSIVE TO FORCE FIELDS AND APPARATUS FOR USING SAME

[72] Inventor: Dale O. Ballinger, Denver, Colo.

[73] Assignee: Honeywell Inc., Minneapolis, Minn.

[22] Filed: Sept. 25, 1969

[21] Appl. No.: 860,962

[52] U.S. Cl. ..............346/74 MP, 101/DIG. 13, 178/6.6 TP, 346/74 ES, 346/74 M

[51] Int. Cl. ...............G03g 15/00, G03g 19/00, G11b 11/14

[58] Field of Search ..............346/74 ES, 74 EB, 74 MP, 135; 101/DIG. 13; 324/38, 43; 178/6.6 TP, 7.3 D, 7.5 D; 340/173 LM, 174.1 MO; 117/36.1

[56] References Cited

UNITED STATES PATENTS 3,171,106 2/1965 Lemmond ........................178/6.6 TP
3,175,196 3/1965 Lee ..................................178/6.6 TP
3,221,315 11/1965 Brown ..................................346/135
3,482,969 12/1969 Ewing ..............................178/6.6 TP
3,485,621 12/1969 Kazan............................346/74 ES X

*Primary Examiner*—Howard W. Britton
*Attorney*—Arthur H. Swanson and Lockwood D. Burton

[57] ABSTRACT

A recording medium is shown which is responsive to a magnetic or an electrostatic field for recording an input signal thereon. The recording medium includes a continuous web formed from a thermal sensitive material in which highly reflective flake-like particles are preoriented parallel to the plane thereof. These preoriented, reflective flake-like particles form a light background across the surface of the recording medium by reflecting ambient light therefrom. Exposure to a magnetic or an electrostatic field in response to an input signal reorients the reflective particles causing them to absorb ambient light for forming a recording trace thereon. Heat is utilized to permanently fix the recording trace upon the thermal sensitive recording medium.

6 Claims, 5 Drawing Figures

PATENTED MAY 9 1972

3,662,397

INVENTOR.
DALE O. BALLINGER
BY M. Michael Carpenter
ATTORNEY.

THERMAL SENSITIVE RECORDING MEDIUM RESPONSIVE TO FORCE FIELDS AND APPARATUS FOR USING SAME

The present invention relates to a thermal sensitive recording medium; and, more particularly, to a thermal sensitive recording medium which responds to a force field for reorienting reflective flake-like particles contained therein and thereby changing a contrast between that portion of the recording medium exposed to the force field and the unexposed portion thereof. Thermal energy is utilized to permanently fix the recording trace thus formed.

In my copending patent application entitled "A Recording Medium Responsive to Force Fields," Ser. No. 828,993, filed May 29, 1969, a recording medium is disclosed which responds to force fields, such as electrostatic or magnetic fields, for recording an input signal upon the surface thereof. The recording medium contains preoriented highly reflective flake-like particles which reflect ambient light for forming a light background surface upon the face of the recording medium. Exposure to the force field reorients the reflective flake-like particles for absorbing the ambient light in the area of the reorientation. The input signal thus recorded may then be erased by exposing the recording medium to a second force field. In this sense, the recorded input signal is not a permanent signal and the display thereof may be destroyed by exposing the recording medium to a force field.

Accordingly, it is an object of the present invention to provide a recording medium and apparatus therefore which permanently records an input signal.

Another object of the invention herein presented is to provide a recording medium which is capable of recording and immediately displaying an input signal.

Still another object of the invention is to provide a thermal sensitive recording medium which is capable of recording an input signal for immediate and permanent display.

A further object of this invention is to provide a recording apparatus which is capable of permanently recording and immediately displaying an input signal at a high speed through the utilization of a minimum number of moving components.

In accomplishing these and other objects, there has been provided a continuous web of thermal sensitive material having highly reflective flake-like particles suspended therein. Exposure of the recording medium to a force field reorients the flake-like particles which provides a visual contrast between the area thus exposed and the unexposed portions of the recording medium for recording an input signal thereon.

Other objects and many of the attendant advantages of the present invention will become readily apparent to those skilled in the art as a better understanding thereof is obtained by reference to the following detailed description when considered in connection with the accompanying drawings, wherein.

Figure 1:
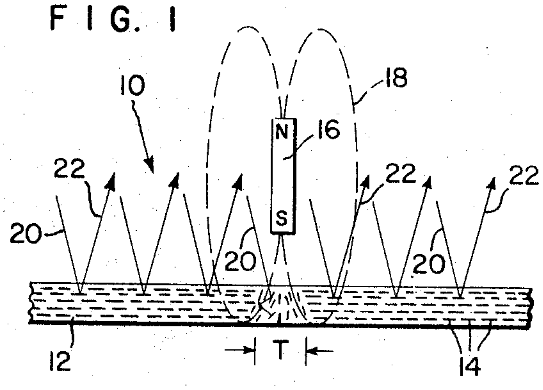
FIG. 1 is a cross-sectional view, showing the thermal sensitive recording medium of the present invention and illustrating the recording principle thereof.

Referring now to the drawings, FIG. 1 illustrates a recording medium 10 including a continuous web member 12 which may be formed from a suitable thermal sensitive material, such as a thermoplastic or a thermosetting material. The thermoplastic material may be chosen from a group of suitable resins, such as polyethylenes or polyimides; while the thermosetting material may be chosen from a group of suitable resins, such as alkyds or diallylphthalates. Suspended within the continuous web member 12 are highly reflective flake-like particles 14 which are responsive to a force field, such as a magnetic or an electrostatic field. The flake-like particles 14 may be formed from paramagnetic or ferromagnetic material, such as iron, nickel or stainless steel; from nonmagnetic material such as aluminum; or from a combination of both magnetic and nonmagnetic materials, such as a nickel plated aluminum. One of the important features of the particles 14 is that they are substantially flake, disc, plate or leaf-shaped and not acicular, as in the prior art. The present invention shall refer to the particles as flake-like particles but it is to be understood that this is a descriptive term and not meant to limit the flat, broad shape of the material. The flake-like particles range in surface size from 10 to 50 microns with an average thickness of 1 micron. Each flake-like particle therefore has an aspect ratio between 5:1 and 50:1. A second important feature of the flake-like particles is that they are highly reflective. Reflectivity of the reflection coefficient, is defined as a ratio of the radiant energy which is reflected from a surface to the total incident energy which strikes that surface. This coefficient may refer to diffused or to specular reflection and in general varies with the angle of incidence and with the wavelengths of the ambient light. For example, physics handbooks indicate that the reflectivity of polished nickel varies from 0.37 to 0.95 depending on the wavelength of the normally incident light; while stainless steel varies between 0.33 to 0.93. In the present invention, it has been found that the flake-like particles may be polished to form a reflective surface having an average reflectivity of 0.4 or more.

The highly reflective flake-like particles 14 are preoriented in a position substantially parallel to the plane of the continuous web member 12. Obviously, not all flakes are parallel; but statistically more flakes are oriented parallel to the substrate than are otherwise positioned. This orientation may be achieved by several methods. One preferred method described in my copending application, Ser. No. 828,933, utilizes a first magnetic field generated by a pair of permanent magnets located on opposite edges of the recording medium 10. A second magnetic field is generated by a coil wound in a manner which allows the recording medium to pass therethrough. An A.C. signal generated within the coil produces a second flux field whose axis parallel the longitudinal axis of the recording medium. In this manner, the reflective flake-like particles 14 are oriented along two axes parallel to the plane of the continuous web member 12. The presence of a force field, such as that generated by a permanent magnet or an electrostatically charged probe, reorients the reflective flake-like particles 14. As shown in FIG. 1, a permanent magnet 16 generates a magnetic flux field indicated by dashed line 18. The flux field penetrates the continuous web member 12 for reorienting the reflective flake-like particles 14, which in this embodiment are magnetic particles. This reorientation creates a recording trace illustrated in FIG. 1 as having a width "T." In this area, the reflective, magnetic flake-like particles 14 are reoriented with those at the center of the magnetic field substantially perpendicular to the continuous web member 12; while others are oriented at an angle thereto. Toward the edge of the magnetic field, the reflective magnetic flake-like particles 14 are generally oriented at an angle to the continuous web member as they attempt to orient parallel to the lines of flux established thereby. Incident light rays 20 striking the surface of the recording medium 10 are reflected by the highly reflective, magnetic flakes 14 and returned as reflected light rays 22 in the areas of the recording medium 10 which have not been exposed to the magnetic field. However, in the area of the recording medium exposed to the magnetic field, the incident light rays are scattered into continuous web member 12 by the multiple reflective surfaces of the magnetic flakes and are there absorbed. This scattering prevents the light rays from being reflected out of the web member thereby creating a contrast which displays the recorded input signal, as a dark image upon the light background.

It may now be noted that the technique just described is achieved without the necessity of providing a light absorbing or reflecting substrate, as in prior art arrangements. The prior art utilizes a shutter technique wherein the magnetic particles are reoriented for exposing the substrate. The prior art substrate either reflects or absorbs the ambient light for forming a visible recording trace upon the recording medium. The present invention produces an improved contrast between the recording trace and the background through the utilization of a reflection absorption technique. That is, no substrate is required as the ambient light does not pass through the continuous web member forming the recording medium of the present invention. Another prior art arrangement utilizes a transparency wherein the recording medium contains conductive, randomly oriented opaque particles. These particles are exposed to an electric field which tends to align them parallel to the field. The transmission of ambient light through the recording medium thus provides a representation of the recording. However, this transparent arrangement relies on the prior art shutter technique and does not provide the contrast available in the present invention.

Figure 2:
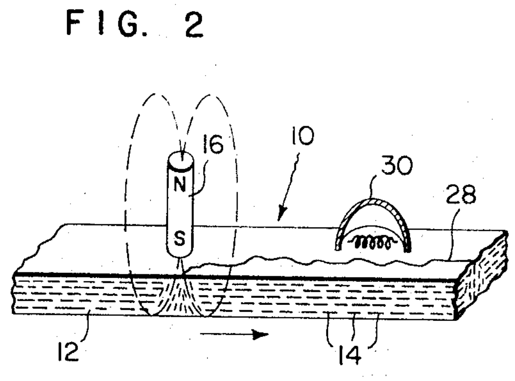
FIG. 2 is a perspective view, partially cross sectional, showing the thermal sensitive recording medium of the present invention and means for recording thereon.

In the present invention, the thermal sensitive material retains the force field responsive, reflective flake-like particles 14 in a preoriented arrangement wherein the plane of each flake-like particle parallels the plane of the continuous web member 12. In FIG. 2, the thermal sensitive continuous web member 12 is illustrated as a thermosetting material in which the force field responsive, highly reflective flake-like particles 14 have been suspended. The recording medium 10 is exposed to a force field in the form of a magnetic field generated by a permanent magnet 16. The permanent magnet 16 reorients the preoriented, highly reflective flake-like particles 14 for forming a recording trace 18 upon the light background surface of the recording medium 10. A heating element 30 supplies thermal energy which causes the thermosetting material to become permanently rigid as the heat is applied thereto. Through this arrangement the input signal is recorded as the recording trace 28 upon the recording medium 10 and is permanently fixed thereon by the thermal energy from heat element 30.

Figures 3, 4, 5:
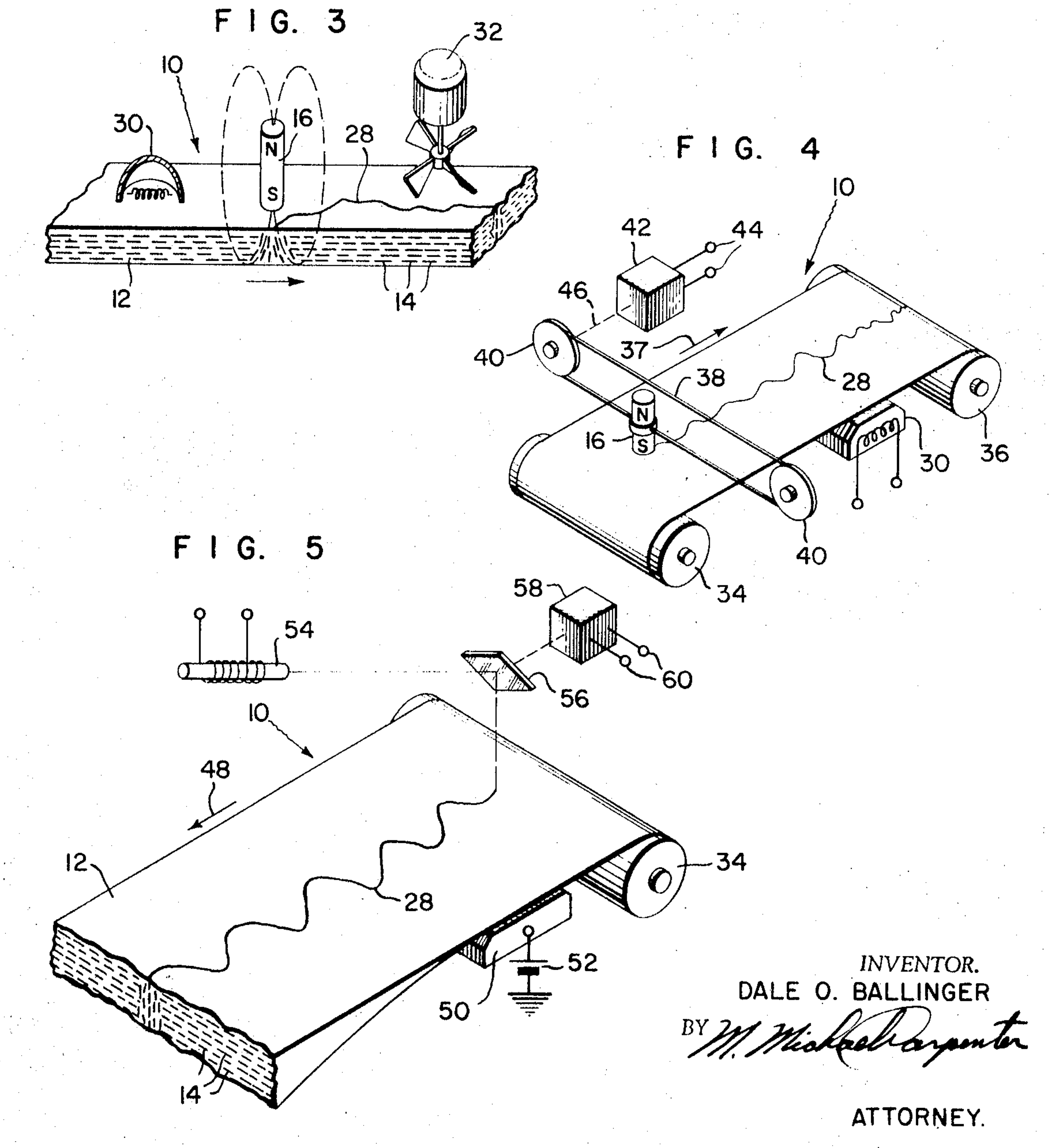
FIG. 3 is a partially cross sectional perspective view, similar to FIG. 2, showing a second embodiment of the thermal sensitive recording medium of the present invention and means for recording thereon.
FIG. 4 is a perspective view, showing a means for recording upon the recording medium of the present invention.
FIG. 5 is a perspective view, showing a second means for recording upon the recording medium of the present invention.

A second embodiment of the present invention is illustrated in FIG. 3. Here, the thermal sensitive continuous web 12 which forms the recording medium 10 is constructed from a thermoplastic material in which the highly reflective flake-like particles 14 have been preoriented in a plane parallel to the plane thereof. This preorientation may be achieved at any suitable time during the manufacture of the recording medium in a matter similar to that discussed herein regarding FIG. 1. During recording, the recording medium 10 is drawn past a heating element 30 which softens the thermoplastic material of the continuous web member 12. Once the thermoplastic material is softened, the flux field generated by the permanent magnet 16, which moves in response to an input signal to be recorded, reorients the reflective flakes 14 for producing a recording trace 28 upon the surface of the recording medium. The thermoplastic material forming the continuous web 12 is then allowed to harden by natural cooling or a fan 32 may be provided for speeding the cooling process. As the thermoplastic material cools, it hardens for permanently fixing the reflective flake-like particles 14 therein. This in turn permanently fixes the recording trace 28 upon the recording medium 10.

In FIG. 4, a recording apparatus is shown which embodies the recording medium of the present invention. Here, the highly reflective flake-like particles 14 are constructed from a magnetic material and the force field generated by the recording apparatus is a magnetic field. Further, the continuous web member 12, which forms the recording medium 10, is constructed from a thermosetting material. The recording medium 10 is unwound from a supply reel 34 by the driving action of a take-up reel 36 in the direction indicated by arrow 37. As the recording medium passes through a recording station, located between the supply and take-up reels 34 and 36, it is exposed to a magnetic force field generated by a permanent magnet 16. The permanent magnet 16 is suitably mounted upon a continuous suspension wire 38 which, in turn, mounts upon a pair of pulleys 40. The pulleys are driven by a potentiometer driving arrangement 42. An input signal is applied across input terminals 44 to which the potentiometer driving arrangement 42 responds for driving the pulleys 40 through a suitable driving connection illustrated by dash line 46. In this manner, the permanent magnet 16 reorients the reflective flakes within the recording medium 10 for displaying a recording trace 28 thereon. A heating element 30 supplies the thermal energy which causes thermosetting material within the continuous web of the recording medium 10 to become permanently rigid. Through this arrangement, the recorded input signal is permanently recorded and displayed upon the recording medium.

Referring to FIG. 5, a second recording apparatus is illustrated in which the recording medium of the present invention may be used. Here, the force field to which the recording medium 10 responds is provided by an electrostatic force field and the reflective flakes are selected from suitable conductive material, responsive to the electrostatic force field. The thermal sensitive recording medium is formed from a continuous web of thermoplastic material. In this embodiment, the recording medium 10 is unwound from a supply reel 34 in the direction indicated by the arrow 48. As the recording medium passes through a recording station, located just beyond the supply reel 34, it passes over a platen 50 which has been charged to a positive potential by a battery 52. Thermal energy, in the form of concentrated electromagnetic energy which generates heat, is supplied by a suitable laser arrangement 54. This energy is reflected from a mirror 56 suspended within a galvanometer type instrument and driven by an input signal supplied by an input amplifier 58 having input terminals 60. An input signal applied to the input terminals 60 of the input amplifier 58 causes a current to flow through a coil or other suitable means for deflecting the mirror 56. As the mirror deflects in response to the input signal, it directs the thermal energy generated by the concentrated electromagnetic energy from the laser 54 onto the surface of the recording medium 10. This concentrated thermal energy causes the thermoplastic material within the continuous web member of the recording medium to soften. The electrostatic field generated by the platen 50 creates a current within each highly reflective flake-like particles thereby causing it to reorient in the softened area so that the plane thereof is parallel with the field. The continuous web member of the recording medium 10 is then allowed to cool as it passes out of the concentrated thermal energy and over the platen 50. This allows the thermoplastic material to harden with the reflective flake-like particles reoriented along an area previously softened by the thermal energy which was offset across the recording medium in response to the input signal to be recorded. Thus, a recording trace 28 is permanently recorded and displayed upon the surface of the recording medium 10.

It will be seen that the present invention provides a recording medium which responds to a magnetic or an electrostatic force field for recording an input signal upon the surface thereof. This recording medium is formed from a thermal sensitive, continuous web which utilizes thermal energy for permanently fixing the input signal recorded upon the surface thereof to produce a permanent display of the recorded input signal. The recording medium of the present invention has been described in combination with recording apparatus which re capable of recording a single trace thereof. However, it will be obvious to those skilled in the art that more than one trace may be recorded upon the recording medium by simply substituting the single field force generating means with more than one such means.

Obviously, many further modifications and variations of the present invention will become apparent to those skilled in the art in light of the above teachings, and, therefore, the present invention should be limited only by the appended claims.

The embodiments of the invention in which an exclusive property or privilege is claimed are defined as follows:

1. A recorder for recording an input signal, comprising:

a recording medium formed from a continuous thermoplastic web member;

highly reflective, field responsive flake-like particles contained within said continuous web and exposed to incident electromagnetic energy;

said highly reflective flake-like particles being preoriented with their faces parallel with the plane of said continuous web for forming a uniform background surface on said web member by reflecting incident electromagnetic energy therefrom;

a recording station;

means for drawing said recording medium through said recording station;

force field means located at said recording station for reorienting said preoriented, highly reflective, force responsive and flake-like particles within said recording medium for absorbing incident electromagnetic energy therein;

thermal means located at said recording station for generating a concentrated beam of electromagnetic energy upon said recording medium capable of causing the softening of said thermoplastic web member in the area of said beam through the thermal energy supplied to said thermoplastic web member by said beam of electromagnetic energy; and displacement means responsive to said input signal for selectively displacing said beam of electromagnetic energy across said continuous web member forming said recording medium for softening said web along a recording line and concurrently allowing said force field means to reorient said reflective flake-like particles along said recording line to form a recording trace;

said thermoplastic web member forming said recording medium hardening after exposure to said thermal energy in said beam for permanently forming said recording trace as a recording of said input signal.

2. A recorder as claimed in claim 1 wherein said thermal means includes a laser for generating said beam of electromagnetic energy.

3. A recorder as claimed in claim 1 wherein said displacement means includes electromagnetic energy reflecting means responsive to said input signal for selectively displacing said beam of electromagnetic energy across said continuous web member.

4. A recorder as claimed in claim 1 wherein said flake-like particles are electrically conductive and are responsive to an electrostatic force field and said force field means includes 5. A recorder for recording an input signal on a continuous web member formed from a thermoplastic material having highly reflective, force field responsive and flake-like particles contained therein and exposed to incident electromagnetic energy and said highly reflective flake-like particles being preoriented with their faces parallel with the plane of said continuous web member for reflecting incident electromagnetic energy therefrom thereby producing a uniform background surface on said continuous web member comprising:

force field means for reorienting said preoriented flake-like particles within said continuous web member for absorbing incident electromagnetic energy therein;

thermal means for generating a concentrated beam of electromagnetic energy upon said recording medium capable of softening said thermoplastic web member in the area of said beam through the thermal energy supplied by said beam and displacement means responsive to said input signal for selectively displacing said beam of electromagnetic energy across said continuous web member in an area encompassed by said force field means in response to said input signal for softening said web member along a recording line and concurrently allowing said force field means to reorient said flake-like particles along said recording line thus forming a recording trace;

said thermoplastic material forming said continuous web member hardening after exposure to said thermal energy in said beam for permanently forming said recording trace as a recording of said input signal.

6. A recorder for recording an input signal on a continuous web member formed from a thermoplastic material having highly reflective, force field responsive and flake-like particles contained therein and exposed to incident electromagnetic energy with said particles being preoriented in a uniform relationship with a plane of said web member to provide a uniform background surface on said web member with respect to incident electromagnetic energy comprising;

force field means for reorienting said preoriented particles within said web member to produce a contrasting relationship with respect to said preoriented particles for incident electromagnetic energy;

thermal means for generating a concentrated beam of electromagnetic energy upon said web member capable of softening said thermoplastic web member in the area of said beam through the thermal energy supplied by said beam and displacement means responsive to said input signal for selectively displacing said beam of electromagnetic energy across said continuous web member in an area encompassed by said force field means in response to said input signal for softening said web member along a recording line and concurrently allowing said force field means to reorient said flake-like particles along said recording line thus forming a recording trace;

said thermoplastic material forming said continuous web member hardening after exposure to said thermal energy in said beam for permanently forming said recording trace as a recording of said input signal.

* * * * *